(12) United States Patent
Dillaway

(10) Patent No.: US 8,555,335 B2
(45) Date of Patent: Oct. 8, 2013

(54) SECURING DISTRIBUTED APPLICATION INFORMATION DELIVERY

(75) Inventor: Blair B. Dillaway, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1397 days.

(21) Appl. No.: 11/555,610

(22) Filed: Nov. 1, 2006

(65) Prior Publication Data

US 2008/0104666 A1 May 1, 2008

(51) Int. Cl.
*G06F 7/04* (2006.01)

(52) U.S. Cl.
USPC .................................. 726/2; 726/6

(58) Field of Classification Search
USPC ............................ 726/1–7, 16–17, 21–27, 30; 713/155–157, 175–177
See application file for complete search history.

(56) References Cited

U.S. PATENT DOCUMENTS

| | | | |
|---|---|---|---|
| 5,630,129 A | 5/1997 | Wheat | |
| 5,649,099 A * | 7/1997 | Theimer et al. | 726/4 |
| 6,523,065 B1 | 2/2003 | Combs et al. | |
| 6,601,084 B1 * | 7/2003 | Bhaskaran et al. | 718/105 |
| 6,766,348 B1 * | 7/2004 | Combs et al. | 718/104 |
| 6,851,058 B1 * | 2/2005 | Gartside | 726/24 |
| 7,054,943 B1 | 5/2006 | Goldszmidt et al. | |
| 7,062,654 B2 | 6/2006 | Millen et al. | |
| 2001/0014943 A1 * | 8/2001 | Wray | 713/157 |
| 2002/0010861 A1 * | 1/2002 | Matsuyama et al. | 713/182 |
| 2002/0087859 A1 * | 7/2002 | Weeks et al. | 713/156 |
| 2002/0087861 A1 * | 7/2002 | Segev et al. | 713/168 |
| 2002/0087862 A1 * | 7/2002 | Jain et al. | 713/176 |
| 2002/0116492 A1 * | 8/2002 | Oldenborgh et al. | 709/224 |
| 2002/0133536 A1 * | 9/2002 | Ramachandran | 709/201 |
| 2003/0014646 A1 * | 1/2003 | Buddhikot et al. | 713/184 |
| 2003/0079143 A1 * | 4/2003 | Mikel et al. | 713/200 |
| 2004/0243835 A1 | 12/2004 | Terzis et al. | |
| 2005/0021751 A1 * | 1/2005 | Block et al. | 709/225 |
| 2005/0086300 A1 | 4/2005 | Yeager et al. | |
| 2005/0125537 A1 | 6/2005 | Martins et al. | |
| 2005/0149749 A1 * | 7/2005 | Van Brabant | 713/200 |
| 2005/0155033 A1 | 7/2005 | Luoffo et al. | |
| 2005/0166041 A1 | 7/2005 | Brown | |
| 2005/0268103 A1 * | 12/2005 | Camenisch | 713/176 |
| 2006/0013338 A1 | 1/2006 | Gore et al. | |

(Continued)

FOREIGN PATENT DOCUMENTS

| | | |
|---|---|---|
| KR | 20060096979 | 9/2006 |
| WO | WO2005069138 | 7/2005 |

OTHER PUBLICATIONS

PCT Search Report for PCT Application No. PCT/US2007/083390, mailed Apr. 21, 2008 (10 pages).

(Continued)

*Primary Examiner* — Eleni Shiferaw
*Assistant Examiner* — Phy Anh Vu
(74) *Attorney, Agent, or Firm* — Lee & Hayes, PLLC

(57) ABSTRACT

In an example implementation, a data structure comports with a secure application instruction protocol. The data structure includes a first application-level request and a second application-level request. The first application-level request has application-specific instructions from a requestor and a requestor signature over the application-specific instructions from the requestor. The second application-level request has application-specific instructions from an intermediary and an intermediary signature over at least the application-specific instructions from the intermediary.

16 Claims, 8 Drawing Sheets

(56) References Cited

U.S. PATENT DOCUMENTS

| | | | |
|---|---|---|---|
| 2006/0059565 A1* | 3/2006 | Green et al. | 726/27 |
| 2006/0064698 A1 | 3/2006 | Miller et al. | |
| 2006/0075042 A1 | 4/2006 | Wang et al. | |
| 2006/0150158 A1 | 7/2006 | Fellenstein et al. | |
| 2006/0236398 A1* | 10/2006 | Trakic et al. | 726/24 |
| 2008/0141375 A1* | 6/2008 | Amundsen | 726/24 |
| 2011/0078691 A1* | 3/2011 | Yildiz et al. | 718/103 |

OTHER PUBLICATIONS

Translated the Chinese Office Action mailed Jun. 9, 2011 for Chinese patent application No. 200780040981.0, a counterpart foreign application of U.S. Appl. No. 11/555,610, 9 pages.

Allen, et al., "The Cactus Worm: Experiments with Dynamic Resource Discovery and Allocation in a Grid Environment", available at <<http://people.cs.uchicago.edu/~dangulo/papers/ijsa-paper.doc.>>, 14 pages, 2001.

Deitch, "Service Level Agreements for the Commercial Grid", available at <<http://www.rh.edu/~rhb/es_seminar_2004/SessionA1/deitch.pdf>>, 20th CompUter Science Seminar, pp. 1-6.

Pathak, et al., "A Framework for Dynamic Resource Management on the Grid", retrieved at <<http://www.hpl.hp.com/technoports/2005/HPL-2005-153.pdf>>, Hewlett-Packard Development Company, L.P., Aug. 22, 2005, pp. 1-11.

Yang, et al., "Policy-Based Resource Management and Service Provisioning in GMPLS Networks", available at <<http://dragon.maxgigapop.net/twiki/pub/DRAGON/PolicyBasedResourcemanagementAndServiceProvisioning/DRAGON-A-PBM-Final.pdf>>, pp. 1-12, 2006.

Translated the Israeli Office Action mailed Aug. 15, 2012 for Israeli patent application No. 197360, a counterpart foreign application of U.S. Appl. No. 11/555,610, 4 pages.

Translated the Japanese Office Action mailed Dec. 21, 2012 for Japanese patent application No. 2009-534953, a counterpart foreign application of U.S. Appl. No. 11/555,610, 9 pages.

Mineo, et al., "A Security Model in Grid Computing", IPSJ SIG Technical Reports, vol. 2006, No. 109, Information Processing Society of Japan, Oct. 23, 2006, 9 pages.

The Chinese Office Action mailed Mar. 12, 2012 for Chinese patent application No. 200780040981.0, a counterpart foreign application of U.S. Appl. No. 11/555,610, 6 pages.

* cited by examiner

SECURING DISTRIBUTED APPLICATION INFORMATION DELIVERY

BACKGROUND

In modern distributed computing systems, it is becoming increasingly important to optimize the use of one or more shared computational resources by a group of users. An example of this phenomenon is grid computing systems. Within a typical grid computing environment, access to a number of computational devices is controlled by a set of job management systems. Job management systems determine the allocation of computational resources to submitted jobs; determine the scheduling of those jobs; and may sometimes determine aspects of the execution context of the jobs, such as billing accounts, security credentials, the location of job activities executing in parallel, and so forth. The purpose of the job management system(s) is to accept job requests from the grid environment's users and to optimize overall use of the computational resources. The computer resources may include supercomputers, computing clusters, application servers, desktop workstations, and so forth.

Distributed computing systems, of which grid systems are an example, may involve a hierarchy of application and resource management systems that support a large number of users and computers. For example, a user may ask a centralized job manager to run an application. The central manager may, in turn, ask a subsidiary job manager that is responsible for a collection of compute clusters to run the application. The subsidiary manager determines the specific computing resource that is most appropriate for the application and then requests that the compute cluster's job manager run the user's application.

In such a hierarchically-managed distributed system, the sequence of job managers that are responsible for the user's application and the assigned compute cluster, including any subsidiary managers, may be dynamically determined based on the overall state of the distributed environment. Because the user may not know the details of where its application will ultimately execute at the time the job request is submitted, it is likely that some information required at application execution time must be supplied by or can better be supplied by one or more of the job managers processing the job request. Existing systems fail to provide efficient and sufficient protections for the security of such information.

SUMMARY

In an example implementation, a data structure comports with a secure application instruction protocol. The data structure includes a first application-level request and a second application-level request. The first application-level request has application-specific instructions from a requestor and a requester signature over the application-specific instructions from the requester. The second application-level request has application-specific instructions from an intermediary and an intermediary signature over at least the application-specific instructions from the intermediary.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction to Securing Distributed Application Information Delivery

As described herein above, some distributed computing systems involve a hierarchy of application and resource management systems that can support a large number of users and computing devices. By way of example only, a user may ask a centralized manager to run an application. The central manager may, in turn, ask a subsidiary manager that is responsible for a collection of computing resource clusters to run the application. The subsidiary manager determines the specific computing resource that is most appropriate for the application and then requests that particular computing resource's manager to run the application.

In such systems, there are typically multiple manager-type intermediaries between the user who needs to run an application and the computing resource that is to actually run the application. Job managers, as discussed above, are one type of manager that are present in such environments. Other types of processing managers that may be present and may assist in processing the user's job request include, but are not limited to, message routing managers, auditing managers, and so forth. These managers can be generically referred to as request-processing intermediaries. Request-processing intermediaries cannot generally be determined a priori because they depend on other applications that are in the process of being scheduled or executed. These other applications are usually unknown to any single requesting user.

With existing approaches, it is difficult to authenticate and/or ensure the integrity of application information (e.g., application-specific instructions), which may have been provided by multiple entities, at the application execution site. The security of such application information can be critically important because the use of improper instructions can result in incorrect billing, data security breaches, incorrect computation, denial of service, and so forth.

Existing approaches generally assume that the entity making a request can ensure the request integrity and perform authentication by sending a secured message to the entity that will ultimately handle the request. These existing approaches do not fully address the issues present in the above-described distributed computing environment because the original requestor, and each intermediary processor, may not know who will ultimately handle the request. Consequently, they can not properly form a secured message to the entity that will ultimately handle the request using conventional approaches. Instead, the request is processed and communicated using a set of independent messages with message security only protecting the contents on a point-to-point basis.

Figure 1:
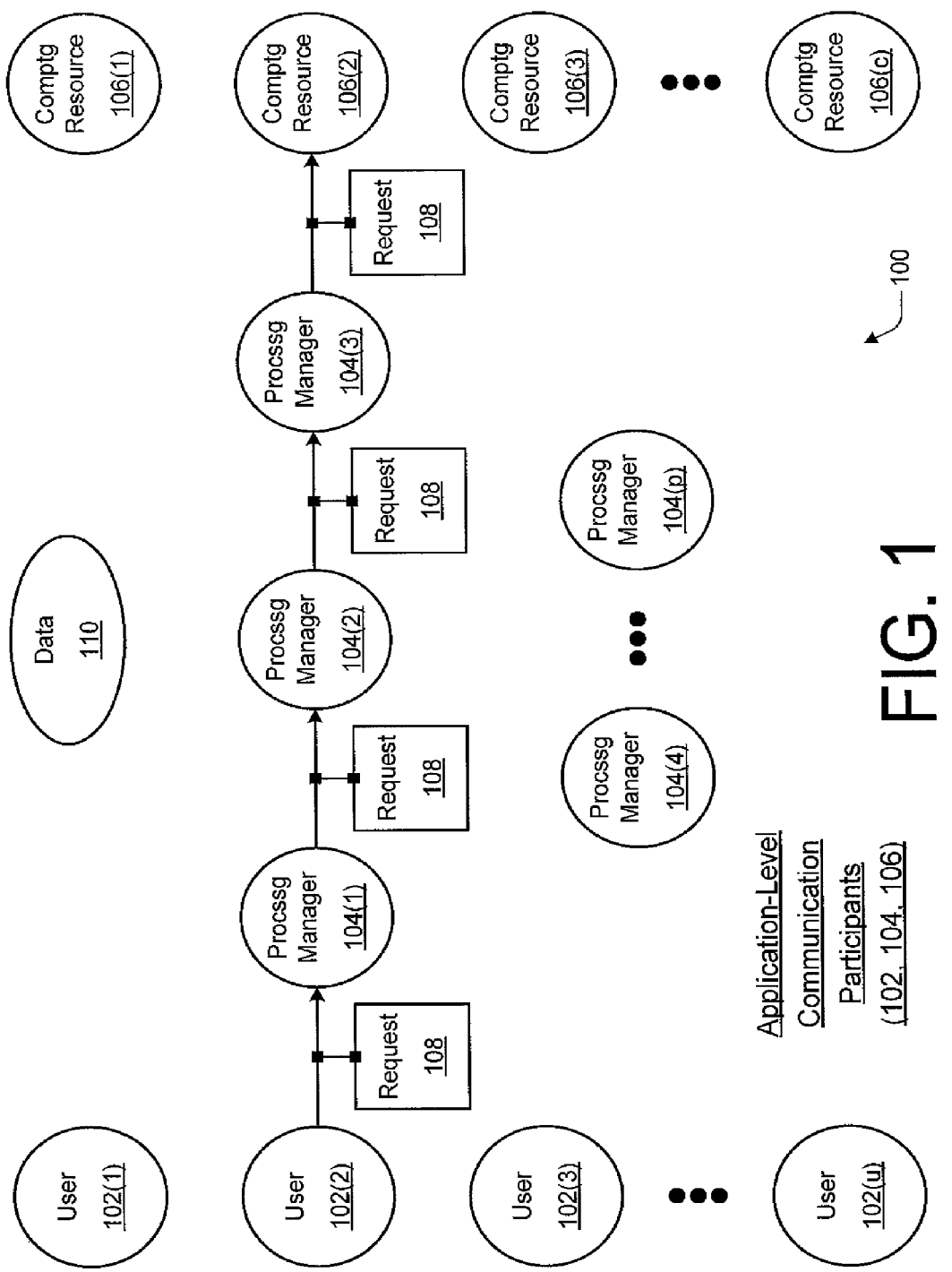
FIG. 1 is a block diagram of an example distributed computing environment in which securing distributed application information delivery may be implemented.

FIG. 1 is a block diagram of an example distributed computing environment 100 in which securing distributed application information delivery may be implemented. As illustrated, distributed computing environment 100 includes "u" users 102, "p" processing managers 104, "c" computing resources 106, requests 108, and data 110. Distributed computing environment 100 represents an environment in which a request 108 from a user 102 is communicated over one or more processing managers 104 so that a job activity may be performed with data 110 on at least one computing resource 106. Application-level-communication participants or entities of distributed computing environment 100 include users 102, processing managers 104, and computing resources 106.

More specifically, distributed computing environment 100 includes user 102(1), user 102(2), user 102(3) . . . user 102(u), with "u" being some positive integer. It also includes processing manager 104(1), processing manager 104(2), processing manager 104(3), processing manager 104(4) . . . processing manager 104(p), with "p" being some positive integer. Additionally, distributed computing environment 100 includes computing resource 106(1), computing resource 106(2), computing resource 106(3) . . . computing resource 106(c), with "c" being some positive integer.

In a described implementation, each user 102 may transmit a task request 108 that asks that some task be performed on data 110. Although only one data element 110 is shown, each user 102 may be associated with its own respective data, with shared data, with multiple units of data, and so forth. For a hierarchy of processing managers 104, request 108 is forwarded from one processing manager 104 to another processing manager 104 until one can directly ask a computing resource 106 to perform the requested task. Each computing resource 106 may be a single computing device, a cluster of computing devices, part of a cluster of computing devices, and so forth.

An example task request is illustrated as part of distributed compute environment 100. For this example task request, user 102(2) has an application that needs to be run or executed on data 110. User 102(2) formulates a request 108 that is realized as a message that is communicated from one participating entity to the next. Request 108 is transmitted from user 102(2) to processing manager 104(1). Processing manager 104(1) forwards request 108 to processing manager 104(2). Processing manager 104(2) forwards request 108 to processing manager 104(3). Processing manager 104(3) ultimately forwards request 108 to computing resource 106(2), which actually performs the requested task. Request 108 may be amended by each processing manager 104 prior to forwarding it.

From a conventional perspective, the type of computer system environment illustrated in FIG. 1 creates two potential security problems. First, each intermediate manager (e.g., processing manager 104) and final compute device(s) (e.g., computing resources 106) likely have access control policies that specify the particular users (e.g., users 102) and intermediary managers on behalf of whom they will do work. This is particularly true if the user, managers, and compute devices are in separate administrative domains with limited cross-domain trust relationships, which is typical in existing large-scale computing Grids and collaborative business systems involving multiple companies. Consequently, each request (e.g., request 108) to an intermediary or ultimate compute device should be able to provide authentication information for the instructions provided by the requesting user and each prior intermediary who processed the application request.

Second, the compute device(s) that run the application typically require access to data resources (e.g., data 110) that are specified by the user. The repository holding this data likely has an access control policy limiting who can operate on the data. Hence, the user and/or processing intermediaries need some mechanism to provide the executing application (e.g., at a computing resource 106) with security credentials that the data repository accepts as valid for granting access to the data.

Existing approaches to these problems are inadequate as they fail to address how a set of application instructions that are incrementally-generated by a series of dynamically-determined intermediate processors can be communicated such that the integrity of each set of application instructions can be verified and an authentication of each intermediate processor can be performed. Consequently, the overall security of such computing systems is often reduced, which can also negatively impact usability.

With respect to the first security problem, existing protocols are not designed to deal with this type of multi-stage processing with incremental discovery of the participating entities. Many protocols are designed for point-to-point use (e.g., IPsec, SSL, DCE/RPC, etc.). These point-to-point protocols allow one to send secured messages between two known end-points (i.e., the destination end-point must be known prior to the message being sent), but any intermediaries between the two end-points see only opaque binary data. One can use such point-to-point protocols to secure the message flows between the communications participants described above, but there is unfortunately no defined relationship between the security on an incoming request at a first participant and the outgoing request for the next participant.

Some other protocols (e.g., SOAP Message Security) are designed to deal with message security to a known end-point while separately addressing security for intermediate processors. However, these protocols still assume that the end-point is known a priori and that it is only the intermediaries that may be discovered dynamically due to routing behaviors. The result is that existing systems tend to employ point-to-point message security in which message authentication and integrity protection are intended for use at the known end-points.

Reliance on secure messages using existing protocols can perform adequately for the described distributed computing environment when all of the processing intermediaries and compute devices are in the same administrative domain or otherwise fully trust each other. In such cases, the fact that such protocols assume the existence of a transitive trust model (i.e., they assume the existence of a trust model in which a recipient of a request trusts the sender and by implication whoever sent the request to the sender) is acceptable. However, when full trust is not justifiable, this assumption can permit a hostile intermediary to launch successful indirect attacks impacting the application to be executed. Additionally, full trust scenarios allow for only coarse-grained access control based on the request sender's identity and the information the request sender encodes in the request. That is, any access control is ultimately based solely on the trust in the entity that sent the secured request message.

With respect to the second security problem, existing approaches allowing the delegation of rights have similar limitations. For example, some Grid job management systems, such as Condor, operate in a matchmaking mode. The Condor manager(s) locate resource(s) to run an application, reserve those resources, and then inform the request originator what resources it may use. This reservation approach is acceptable from a delegation perspective because the requester need only pass the data delegation security credentials to the actual compute device that is to run the request originator's application.

However, this reservation approach has several negative aspects: First, the request originator must remain available because it does not know how long it will take the processing managers to find a suitable compute device. Presumably, the compute device will cancel a resource reservation if the actual application and its associated instructions and delegation credentials are not provided in a reasonable amount of time. Second, the requestor originator requires direct access to the compute device, and this may not be practical or even possible in some complex systems due to network topology, firewalls, and so forth. Third, the managers are probably unaware of what delegations are required; hence, they can not use delegation information to select an appropriate compute device.

In some other implementations, name-password credentials are used to grant access to security credentials that can be used to proxy the request originator (e.g., via a MyProxy server). These name-password credentials are typically passed as data to intermediate managers and eventually to a compute device. While they may be carried in an encrypted message, they are revealed as clear-text data at each intermediate manager and at each compute device. There is no protocol support that allows tracking of the full set of intermediate managers that had access to the credentials and then passed them along. Such tracking information can be important, for example, in auditing who potentially had access to the security credential or other information and in performing a forensic investigation if some unexpected access occurs. In short, with existing approaches, it is difficult to provide an adequate mechanism for securing application-specific information between a request originator and the ultimate computing resource that is to actually run an application.

In contrast, with certain implementations as described herein, a transmission path along communication entity participants 102, 104, and/or 106 (of FIG. 1) may be secured and/or rendered traceable using a secure application instruction protocol. For example, each processing manager 104 may elect to augment request 108 by adding application-specific instructions prior to forwarding it. In some distributed computing networks, the addition of these augmentative instructions may be required by a computing resource 106 for all job activities it is willing to execute. Each processing manager 104 may digitally sign request 108 prior to forwarding it to another processing manager 104. The request augmentation is performed at an application level. The digital signature is applied to the application-specific information. Hence, application-level communication participants 102, 104, and/or 106 may authenticate the entity providing specific application instructions and validate the integrity of this application information. Moreover, the identities of participating entities may be tracked.

More specifically, for a described implementation, a sender of a set of application-specific instructions is allowed to include encrypted security credential information in a form in which a next processing intermediary may decrypt. This processing intermediary may then (i) re-encrypt the credentials in a form another processing intermediary may decrypt and (ii) include this re-encrypted credential in the set of intermediary-supplied application-specific instructions that it creates. This process continues on a point-to-point basis until a final request handler, such as a computing resource, is reached. The credential is used at the request handler. If each set of application-specific instructions is digitally signed, as is described in the preceding paragraph, then a verifiable record of each entity who had access to the clear-text credential is provided.

Figure 2:
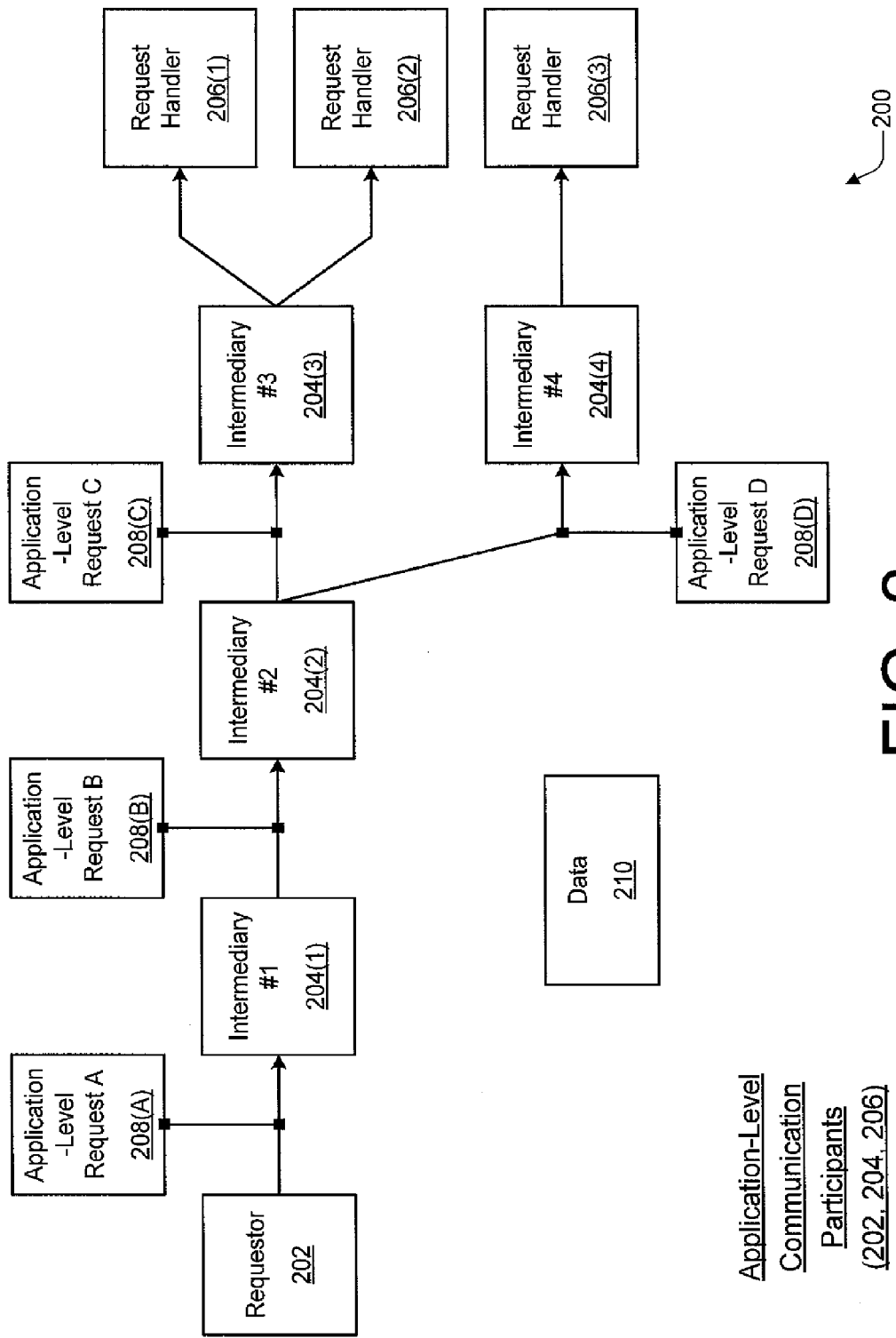
FIG. 2 is a block diagram illustrating a general example computing environment in which securing distributed application information delivery may be implemented for transmitted application-level requests.

Example Implementations for Securing Distributed Application Information Delivery FIG. 2 is a block diagram illustrating a general example computing environment 200 in which securing distributed application information delivery may be implemented for application-level requests 208. As illustrated, computing environment 200 includes a requestor 202, multiple (processing) intermediaries 204, multiple request handlers 206, application-level (task) requests 208, and data 210. In computing environment 200, application-level communication participants or entities include requester 202, intermediaries 204, and request handler 206.

More specifically, four processing intermediaries 204(1), 204(2), 204(3), and 204(4) are shown. Three request handlers 206(1), 206(2), and 206(3) are shown. Four versions of an application-level request 208 are shown: application-level request A 208(A), application-level request B 208(B), application-level request C 208(C), and application-level request D 208(D). Although a specific number of each illustrated type of application-level communication participant is illustrated in computing environment 200, any number of each of requestors 202, intermediaries 204, and/or request handlers 206 may be involved in a given application-level request communication.

In a described implementation generally, a requester 202 originates and initiates an application-level request 208 that is associated with data 210. Application-level request 208 is transmitted between and among one or more processing intermediaries 204. Each processing intermediary 204 determines where application-level request 208 is to be forwarded next. As described further herein below, each intermediary 204 may also augment application-level request 208 by adding application-specific instructions thereto. Eventually, an intermediary 204 forwards an application-level request 208 to at least one request handler 206. Each request handler 206 is capable of executing an application in accordance with application-level instructions received as part of an application-level request 208 and in accordance with its associated data 210.

With regard to FIG. 1, a more-specific distributed computing environment 100 is illustrated. In the context of general computing environment 200 of FIG. 2, a requester 202 may be realized as a user 102, a processing intermediary 204 may be realized as a processing manager 104, and a request handler 206 may be realized as a computing resource 106. Also, application-level request 208 may be realized as request 108, and data 210 may be realized as data 110.

In a described implementation for computing environment 200, requester 202, intermediaries 204, and request handler 206 are interconnected by one or more networks (which are not explicitly illustrated in FIG. 2). Using communication links of such network(s), application-level request 208 is forwarded between and among intermediaries 204 until it is provided to at least one request handler 206 that can perform the requested task.

As illustrated in FIG. 2, and by way of example only, an application-level request A 208(A) is generated by requestor 202. Requestor 202 transmits application-level request A 208(A) to intermediary #1 204(1). Application-level requests 208 may be transmitted as part of a message being communicated in accordance with some transport protocol. The utilized transport protocol may differ between the application-level communication participants 202, 204, and 206.

After some manipulation of the incoming request 208(A), intermediary #1 204(1) transmits application-level request B 208(B) to intermediary #2 204(2). After some manipulation of the incoming request 208(B), intermediary #2 204(2) transmits application-level request C 208(C) to intermediary #3 204(3). Additionally, after some (possibly different) manipulation of the incoming request 208(B), intermediary #2 204(2) also transmits application-level request D 208(D) to intermediary #4 204(4).

Intermediary #3 204(3) separates the requested task of application-level request C 208(C) into two parts. It forwards a first part to a first request handler 206(1) and a second part to a second request handler 206(2). Intermediary #4 204(4) forwards the requested task of application-level request D 208(D) to a third request handler 206(3). Request handlers 206(1), 206(2), and 206(3) each therefore perform a part of the original requested task of application-level request A 208(A).

Figure 3A:
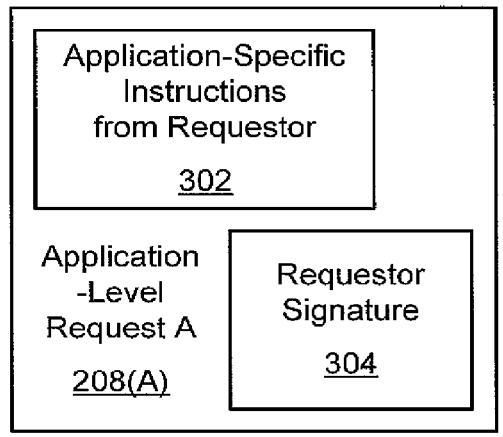
FIGS. 3A, 3B, and 3C are block diagrams illustrating example application-level requests such as those that are shown in the example computing environment of FIG. 2.
Figure 3B:
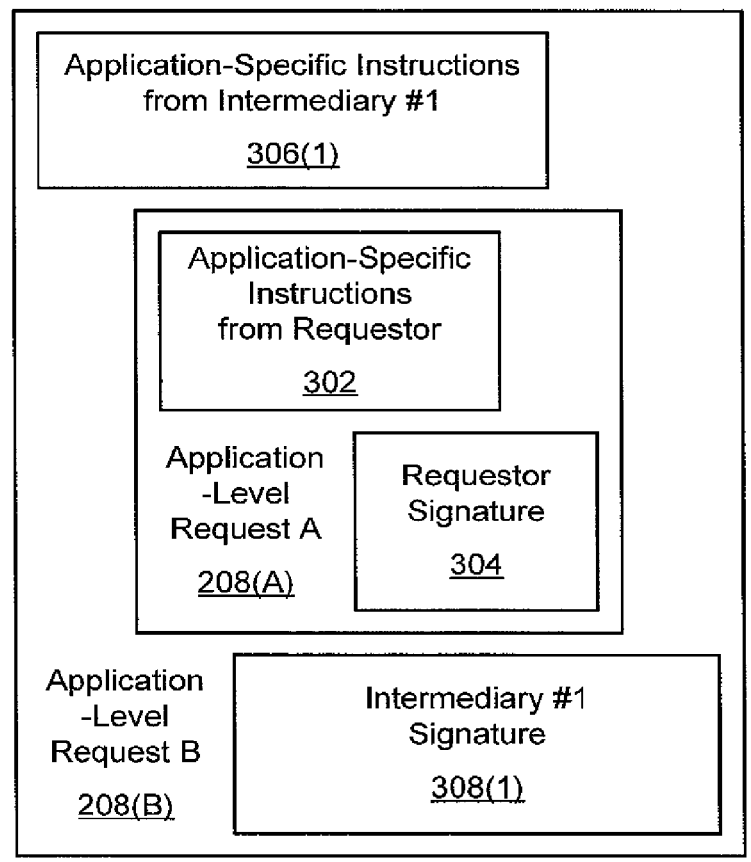
Figure 3C:
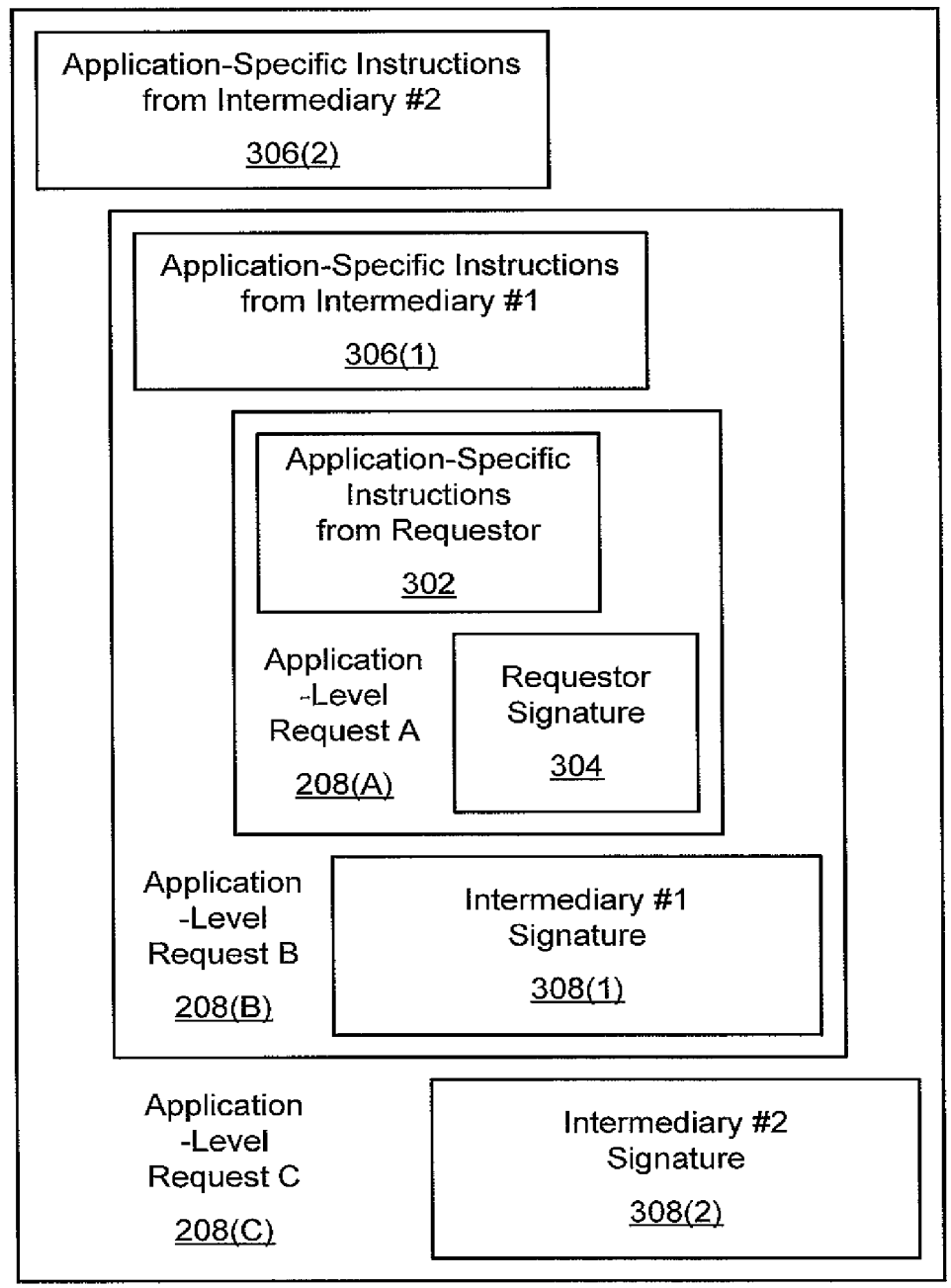

FIGS. 3A, 3B, and 3C are block diagrams illustrating example application-level requests 208, such as those that are shown in the example computing environment of FIG. 2. Specifically, FIG. 3A illustrates an example of application-level request A 208(A). FIG. 3B illustrates an example of application-level request B 208(B). FIG. 3C illustrates an example of application-level request C 208(C).

In a described implementation for FIG. 3A, application-level request A 208(A) includes application-specific instructions from requestor 302 and a requester signature 304. Application-specific instructions from requestor 302 is information that specifies a requested task to be performed. For example, it may specify an application that is to be executed and data on which the application is to execute, as well as any required security credentials. More specifically, application-specific instructions from requester 302 may include, by way of example but not limitation, execution requirements, initialization parameters, required data sources, security context information, and so forth. Requestor 202 ascertains the information for application-specific instructions from requester 302 and formulates application-level request A 208(A).

Requestor signature 304 is a digital signature that is applied to application-specific instructions from requestor 302 by requester 202. In other words, a digital signature procedure is applied to application-level information. Consequently, entities that subsequently receive and process application-level request A 208(A), such as an entity corresponding to intermediary #1 204(1), may perform an authentication check and an integrity validation on application-specific instructions from requester 302. The authentication check determines which requester 202 generated the application-specific instructions 302. The integrity validation validates that the information of application-specific instructions from requestor 302 has not been modified since it was originated (and signed) by requestor 202.

In a described implementation for FIG. 3B, application-level request B 208(B) includes application-specific instructions from intermediary #1 306(1), intermediary #1 signature 308(1), and application-level request A 208(A). Intermediary #1 204(1) accepts incoming application-level request A 208(A) from requester 202 and determines that it should be forwarded, after some manipulation, to intermediary #2 204(2). Intermediary #1 204(1) effectively encapsulates application-level request A 208(A) in application-level request B 208(B).

Intermediary #1 204(1) augments application-level request 208 by adding supplemental application-specific instructions 306 to it. These supplemental instructions are illustrated as application-specific instructions from intermediary #1 306(1). They are intended for processing by a least one subsequent recipient, which may include intermediary #2 204(2) in the example of FIG. 2. Intermediary #1 204(1) also digitally signs application-level request 208 with an intermediary digital signature 308. This digital signature is illustrated as intermediary #1 signature 308(1). Intermediary #1 signature 308(1) is a signature on the application-specific information of application-level request B 208(B). This may include, for example, application-specific instructions from intermediary #1 306(1) and/or application-level request A 208(A). Intermediary #1 204(1) may also digitally sign application-level request A 208(A) if, for example, there are reasons intermediary #1 204(1) is to ensure its application-specific instructions and those provided by requestor 202 are not be modified independently.

In a described implementation for FIG. 3C, application-level request C 208(C) includes application-specific instructions from intermediary #2 306(2), intermediary #2 signature 308(2), and application-level request B 208(B). Intermediary #2 204(2) accepts incoming application-level request B 208(B) from intermediary #1 204(1) and determines that it should be forwarded, at least in part and after some manipulation, to intermediary #3 204(3). Intermediary #2 204(2) effectively encapsulates application-level request B 208(B) in application-level request C 208(C).

Intermediary #2 204(2) augments application-level request 208 by adding supplemental application-specific instructions 306 to it. These supplemental instructions are illustrated as application-specific instructions from intermediary #2 306(2). Intermediary #2 204(2) also digitally signs application-level request 208 with an intermediary digital signature 308. This digital signature is illustrated as intermediary #2 signature 308(2). Intermediary #2 signature 308(2) is a signature on the application-specific information of application-level request C 208(C). This may include, for example, application-specific instructions from intermediary #2 306(2) and/or application-level request B 208(B). Although not separately illustrated, application-level request D 208(D) may be formulated analogously to application-level request C 208(C).

Thus, as illustrated in FIGS. 2 and 3A-3C, a described implementation of an application-level instruction protocol effectively encapsulates an incoming application-level request 208 and produces an outgoing application-level request 208. The outgoing application-level request includes a digital signature 308 over at least part of the application-specific information. It may also include supplemental application-specific instructions 306. As an application-level request 208 propagates through participating application-level communication nodes or entities, a nested set of application-level requests 208 is created as illustrated in particular by FIG. 3C.

This nesting of application-level requests 208, coupled with digital signatures 304 and 308 over each nested request, can enable participants to perform authentications and integrity validations of application-specific information throughout a chain of request transmissions. However, at least the eventual request handler 206 (of FIG. 2) may need to access data 210 to perform a requested task in accordance with application-level request 208. In some implementations, accessing data 210 may require being granted a right to access data 210. Hence, in such implementations, the performance of a requested task by a request handler 206 may entail first granting the implementer a right to access data 210. In a described implementation, this access right to data 210 may be granted via a delegation access control mechanism.

Figure 4:
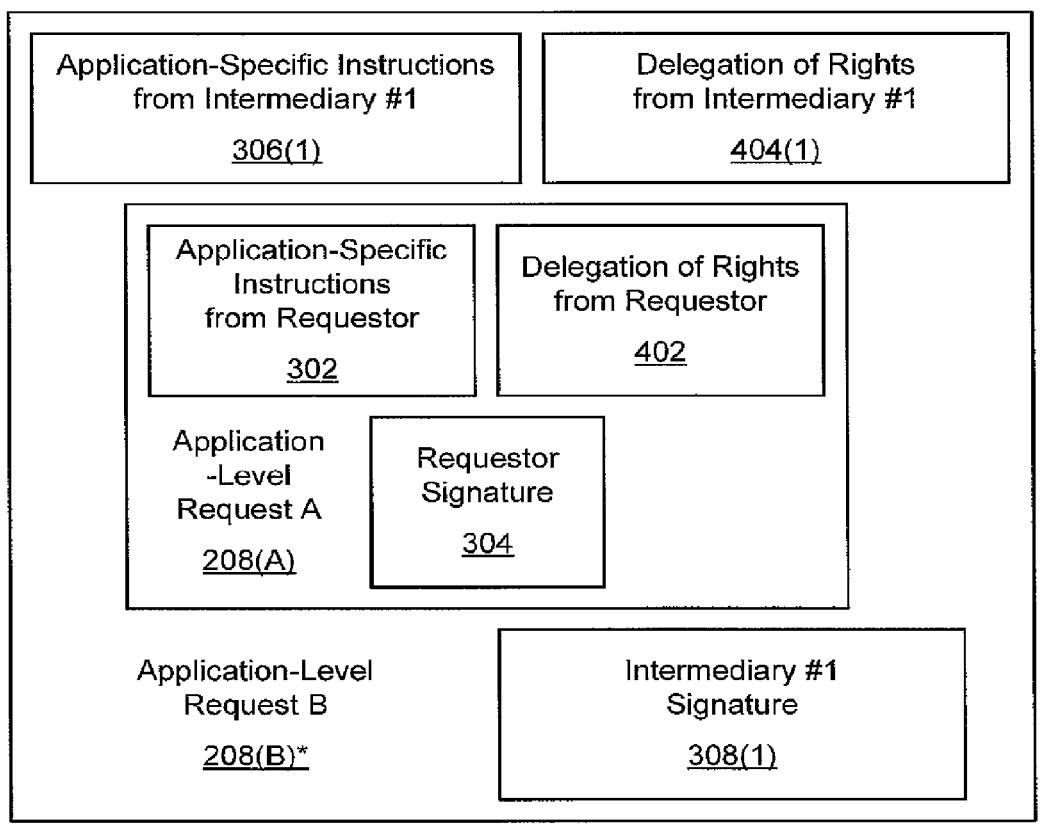
FIG. 4 is a block diagram illustrating an example application-level request that includes a delegation of rights to access data.

FIG. 4 is a block diagram illustrating an example application-level request B 208(B)* that includes a delegation of rights to access data. Application-level request B 208(B)* is application-level request B 208(B) (of FIG. 3B) with data delegation rights information included. As described further herein below, any application-level request 208 may include data delegation rights information in the form of for example, delegation of rights from requestor 402 and/or delegation of rights from an intermediary 404.

As illustrated, application-level request B 208(B)* includes delegation of rights from intermediary #1 404(1) and effectively also includes delegation of rights from requestor 402, which is part of application-level request A 208(A) by virtue of the request nesting. In a described implementation, when requestor 202 formulates application-level request A 208(A), it includes delegation of rights from requestor 402. Requestor 202 has access rights to its data 210. Because requestor 202 may not know which request handler(s) 206 will ultimately need the right to access data 210, requestor 202 may not be able to directly grant access rights to data 210. Consequently, requestor 202 grants a right to delegate access rights to data 210 to subsequent application-level communication participants (e.g., processing intermediaries 204).

Data delegation information (e.g., of delegation of rights from requestor 402, of delegation of rights from an intermediary 404, etc.) is a granting of a delegation right to a first participant that may be transferred or extended to a second participant. In other words, with application-level request A 208(A) (of application-level request B 208(B)*), requestor 202 delegates to intermediary #1 204(1) a right to further grant access rights to data 210 to a downstream communication participant. Intermediary #1 204(1) utilizes this delegation right by adding delegation of rights from intermediary #1 404(1). In other words, with application-level request B 208 (B)*, intermediary #1 204(1) delegates to intermediary #2 204(2) a right to further grant access rights to data 210 to another downstream communication participant. This delegation chain can be extended until the selected request handler 206 is granted access rights to data 210 (e.g., by intermediary #3 204(3) and/or intermediary #4 204(4)). If this delegation information 402 and/or 404 contains secrets (e.g., passwords, cryptographic keys, etc.) that should not be disclosed to unauthorized participants, such information may be encrypted such that the next processing entity may decrypt it. This processing entity may then re-encrypt the secret information for the next processing entity and include it with data delegation information that the request is to be augmented with.

Thus, certain described implementations provide a general application-level security protocol for interactions between a requestor that originates a request, a handler of the request, and one or more intermediaries who process and forward the request between the requestor and the request handler.

Described implementations of the application-level security protocol can be used in situations in which these entities are known prior to the request being issued. Moreover, certain described implementations are capable of dealing with the more complex case in which these entities are not known a priori, but they are instead established incrementally as the request propagates between the requestor and the ultimate request handler.

The flow of request 208 in FIG. 2 illustrates an example of a general message flow pattern that can be handled by an application-level security protocol as described herein. As depicted, the request flow from requestor 202 to request handlers 206 forms a directed graph. At any intermediary 204, request 208 may potentially be forwarded to multiple entities (e.g., one or more other intermediaries 204 and/or request handlers 206). Each flow from a requestor 202 to a request handler 206 may be treated as being logically separate. Computing environment 200 as illustrated in FIG. 2 can therefore be considered to have three logically separate flows. Although implementation efficiency can be improved from the potential re-use of the request processing for one flow in another flow, such re-use need not impact the application-level security protocol. Consequently, the description herein below addresses only a single request flow for the sake of clarity.

As described above, a nesting process for application-level requests 208, in conjunction with digital signatures 304 and 308, provides a mechanism for authenticating requestor 202 and any previous intermediaries 204 that have processed a given request message. Furthermore, the nesting and digital signatures provide mechanisms for independently validating the integrity of the application-level information in the original request and any additional application-level processing instructions added by the intermediaries.

In a described implementation, message composition is accomplished using the nesting process, and this nesting process is coupled with digital signature technology. The digital signatures may be based, for example, on public key cryptography. In the following text and example message request formats, a requestor 202 is termed requester R, intermediaries #1-#n 204(1 . . . n) are termed intermediaries M1-Mn, and a request handler 206 is termed a request handler RH. Using this combined approach of nesting with digital signatures, the requestor R, with key $K_R$, sends to a first intermediary M1 a message containing:

---
Request
Signed by $K_R$.

---

The "Request" corresponds to application-specific instructions from requestor 302 (of FIGS. 3A-4). The "Signed by $K_R$" corresponds to requestor signature 304. Requestor signature 304 may be implemented using, for example, an RSA signature over the request content information using an SHA-1 digest algorithm.

Intermediary M1 can check the signature to authenticate that the request comes from requester R and validate that it has not been modified in transit. If intermediary M1, who has key $K_{M1}$, decides to forward the request to a second intermediary M2, with key $K_{M2}$, intermediary M1 sends a message containing:

---
M1 instructions for M2
Request
Signed by $K_R$
Signed by $K_{M1}$.
---

The "M1 instructions for M2" corresponds to application-specific instructions from intermediary #1 306(1) (of FIGS. 3B-4), which are added by intermediary #1 204(1) for intermediary #2 204(2). The "Signed by $K_{M1}$," corresponds to intermediary #1 signature 308(1). The "M1 instructions for M2" (or any application-specific instructions from an intermediary 306) may be null if no additional application-specific instructions are to be added by implementer M1.

Intermediary M2 can now use the two signatures (304 and 308(1)) to determine [1] that the "M1 instructions for M2" originated from intermediary M1, [2] that intermediary M1 had the original request, [3] that the original request came from requestor R, and [4] that nothing has been modified since the signatures were applied. Intermediary M2 can then use this information to determine if it is willing to process such a request on behalf of both intermediary M1 and requestor R.

This approach is continued through "n" intermediaries M until the actual request handler is ultimately reached, with "n" being some integer. This actual request handler receives a message containing:

---
Mn instructions for Request Handler
Mn−1 instructions for Mn
.....
M1 instructions for M2
Request
Signed by $K_R$
Signed by $K_{M1}$
....
Signed by $K_{Mn-1}$
Signed by $K_{Mn}$.
---

The cryptographic digital signatures $K_R$ and $K_{M1} \ldots K_{Mn}$ are enacted over the data understood at the application layer by the intermediaries and the request handler. This is distinct from network security protocol digital signatures, which are widely used to secure communications, to authenticate and integrity-protect the transmitted message. These widely-used message digital signatures typically cover both the message content and the message headers, as encoded for the specific lower-layer security protocol being used. Consequently, such message digital signatures can not be used for these applications because the headers are not generally meaningful across the intermediaries and because the messaging protocols used may not be identical between all entities participating in the request flow.

As described above with reference to FIG. 4, the delegation of rights to data access can also facilitate using an application-level security protocol in the context of dynamically-discovered message flow participants. Certain described implementations thus provide a mechanism for passing delegation information between the various participating entities. This passing of data delegation information addresses the fact that the entities in the flow may be discovered dynamically. In other words, the passing of data delegation information accommodates the fact that there may be no way for the requester to directly indicate which request handler is to be delegated data access rights when the requestor originally formulates the request.

Security credential information, such as delegation of rights from requestor 402 and/or delegation of rights from intermediaries 404, may be encrypted. Each processing intermediary 204 may decrypt them, perform any relevant analysis, possibly modify them, and then re-encrypt them before forwarding request 208. Encryption may be applied using any commonly-used ciphers (e.g., http://www.w3.org/2001/04/xmlenc#aes128-cbc) or a specially-adapted cipher. Associated decryption keys may be communicated using commonly-available techniques (e.g., RSA key transport as described at http://www.w3.org/2001/04/xmlenc#rsa-oaep-mgf1p) or a specially-designed technique. Associated decryption keys may also be communicated using an AES key wrap (e.g., http://www.w3.org/2001/04/xmlenc#kw-aes128). Other encryption, decryption, and key transport approaches may alternatively be employed.

Certain described implementations of securing distributed application information delivery that entail delegation of rights are agnostic as to what mechanism is used to delegate the data access rights of the requestor to the request handler. Example delegation mechanisms include, by way of example but not limitation, (i) a name-password pair that is used to unlock a delegation credential such as is used with the MyProxy service, (ii) a series of explicit delegation policies/credentials generated at each processing intermediary using a policy language such as the ISO Rights Expression Language (REL), (iii) the Security Policy Assertion Language (SecPAL)™ language from Microsoft®, (iv) some combination thereof, and so forth. An example implementation may use an XML encoding that is employed in conjunction with one or more SOAP-based web service protocols that are being developed for Grid computing distributed job management.

An example described approach is to have the requestor, and each processing intermediary, encode the desired delegation to the next entity that is participating in the message communication flow. If the mechanism involves name-password credentials and a MyProxy service, it takes the form of the name-password encrypted and sent to the next entity in the flow plus a reference to the MyProxy service to use. If the mechanism involves one of the policy language approaches, it entails creating a credential indicating that the next entity participating in the flow has rights to access the required data and/or delegate those rights to others.

Regardless, such data delegation credentials are 'issued', or digitally signed, by the requestor or current processing intermediary. The delegation of rights information may then be combined with the authentication information described above (as illustrated in combination in FIG. 4) to form another described implementation of the application-level security protocol. By way of example only, a described implementation of the application-level security protocol with a delegation of rights component may be generally formatted as follows, with "data access rights" being represented by "DAR":

---
Mn instructions for RH + Mn delegation of DAR to RH
Mn−1 instructions for Mn + Mn−1 delegation of DAR delegation to Mn
.....
M1 instructions for M2 + M1 delegation of DAR delegation to M2
Request + R delegation of DAR delegation to M1
Signed by $K_R$
---

-continued

Signed by $K_{M1}$
....
Signed by $K_{Mn-1}$
Signed by $K_{Mn}$

Figure 5:
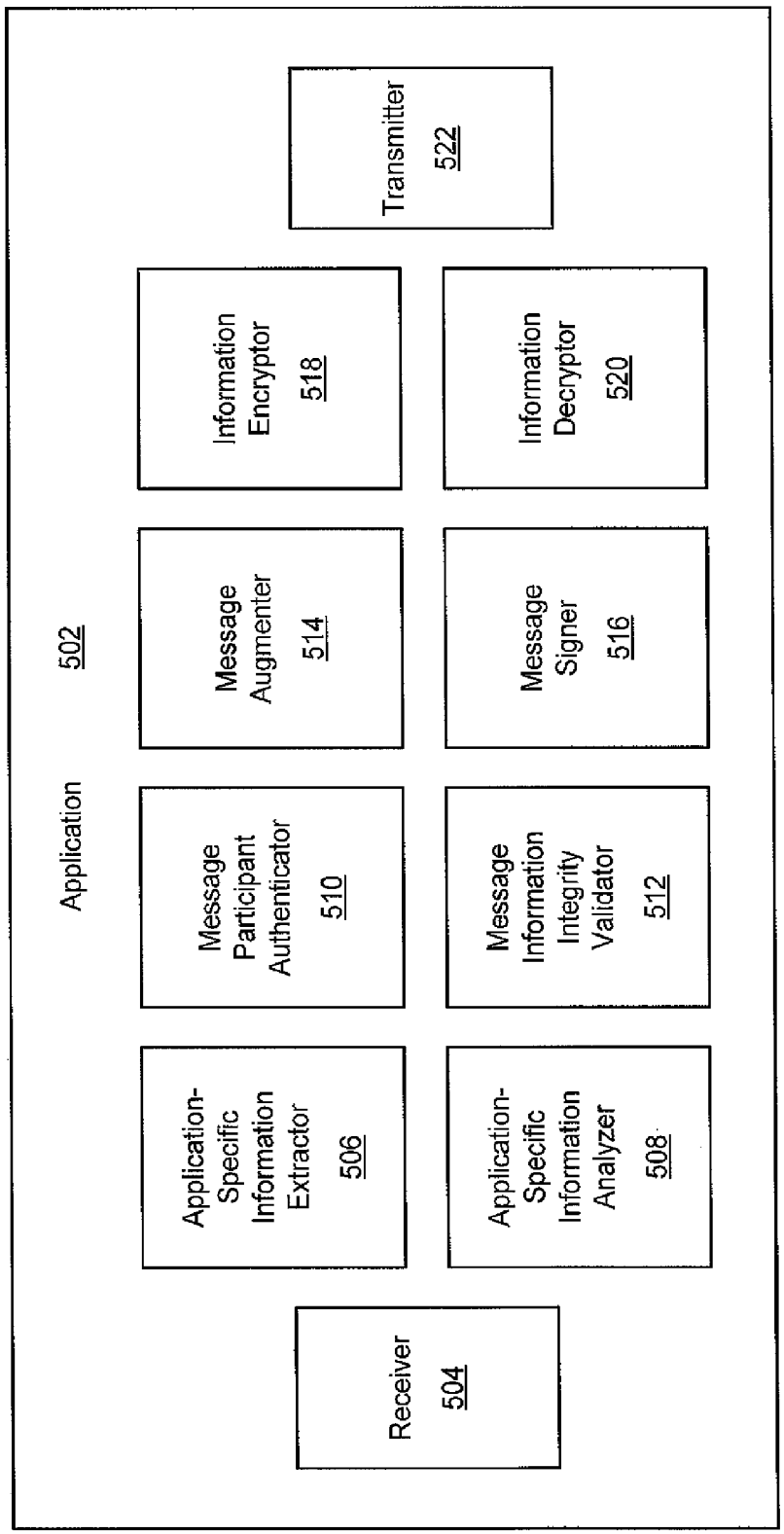
FIG. 5 is a block diagram illustrating an example application that may be executing on an application-level communication participant such as those that are shown in the example computing environment of FIG. 2.

FIG. 5 is a block diagram illustrating an example application 502 that may be executing on an application-level communication participant such as those that are shown in the example computing environment of FIG. 2. As illustrated, application 502 includes ten (10) modules 504-522. These ten modules are receiver 504, application-specific information extractor 506, application-specific information analyzer 508, message participant authenticator 510, message information integrity validator 512, message augmenter 514, message signer 516, information encryptor 518, information decryptor 520, and transmitter 522.

Although ten modules are illustrated for application 502 and described below, an application that is functioning as a participating entity in an application-level security protocol for application instructions may include any number of modules. The description below is primarily directed to an application 502 that is functioning as an intermediary 204. Nevertheless, the functioning of an application 502 may be analogous for other entities, such as a requester 202, a request handler 206, and so forth. However, there may be some differences. For example, a request handler 206 may not need a message augmenter 514 or a message signer 516. A requestor 202 originates a request 208, so it may not need an application-specific information extractor 506 or an application-specific information analyzer 508. On the other hand, including both in an application 502 of a requestor 202 enables the requestor itself to perform some request-tracking forensic analysis of a transmission path of a request 208.

In a described implementation, receiver 504 accepts incoming requests 208 from a layer of a computer's communication stack that is lower than the application layer. Similarly, transmitter 522 sends outgoing requests 208 from an application layer to a lower layer of the communication stack for forwarding to another intermediary 204 or a request handler 206 using a lower-layer communication transport protocol.

In a described implementation, application-specific information extractor 506 extracts application-specific information from incoming requests 208. Examples of application-specific information include, but are not limited to, application-specific instructions from requestor 302, application-specific instructions from an intermediary 306, delegation of rights from requestor 402, delegation of rights from intermediaries 404, and so forth. Application-specific information analyzer 508 analyzes the extracted application-specific information to determine where the request should be forwarded next. The next participating node may be, for example, another intermediary or a request handler. Application-specific information analyzer 508 also analyzes the extracted application-specific information to determine what additional application-specific instructions for this next node, if any, should be added to the incoming request 208 for the outgoing request 208.

Message participant authenticator 510 uses digital signatures to authenticate the origin of a request 208 and/or augmentative application-specific information. Hence, message participant authenticator 510 may use requestor signature 304 to authenticate that the original request 208(A), with application-specific instructions from requestor 302, was initiated by requester 202. It may also use intermediary #1 signature 308(1) to authenticate that the encapsulating request 208(B), with application-specific instructions 306(1), was forwarded from intermediary #1 204(1).

Message information integrity validator 512 uses respective nested digital signatures 304 and 308 to validate the integrity of respective nested application-specific information. More specifically, message information integrity validator 512 uses requester signature 304 to validate the integrity of application-specific instructions from requestor 302 and/or delegation of rights from requestor 402. Message information integrity validator 512 may also use intermediary signature 308 to validate the integrity of application-specific instructions from intermediary 306 and/or delegation of rights from intermediary 404.

Message augmenter 514 adds any additional desired processing instructions. For example, message augmenter 514 may add new application-specific instructions 306 for the next entity recipient (e.g., an intermediary or a request handler) and/or data delegation rights 404, including data access rights, for the next entity recipient. Message signer 516 digitally signs the application-level information to produce intermediary signature 308. The digital signature procedure may be applied over the augmentative information, such as application-specific instructions from an intermediary 306 that are for the next entity recipient. Alternatively, the digital signature procedure may also be enacted over the nested application-level requests 208 so as to provide for verification of the order in which the requests 208 are being created and the instructions are being added.

Encryption and decryption are handled by information encryptor 518 and information decryptor 520, respectively. Information can be decrypted by information decryptor 520. Information can be encrypted and/or re-encrypted by information encryptor 518. The information may be, for example, security credential information. More generally, the information may be any given data, including but not limited to, application-specific instructions 302 and/or 306, delegation of rights 402 and/or 404, and so forth.

Figure 6:
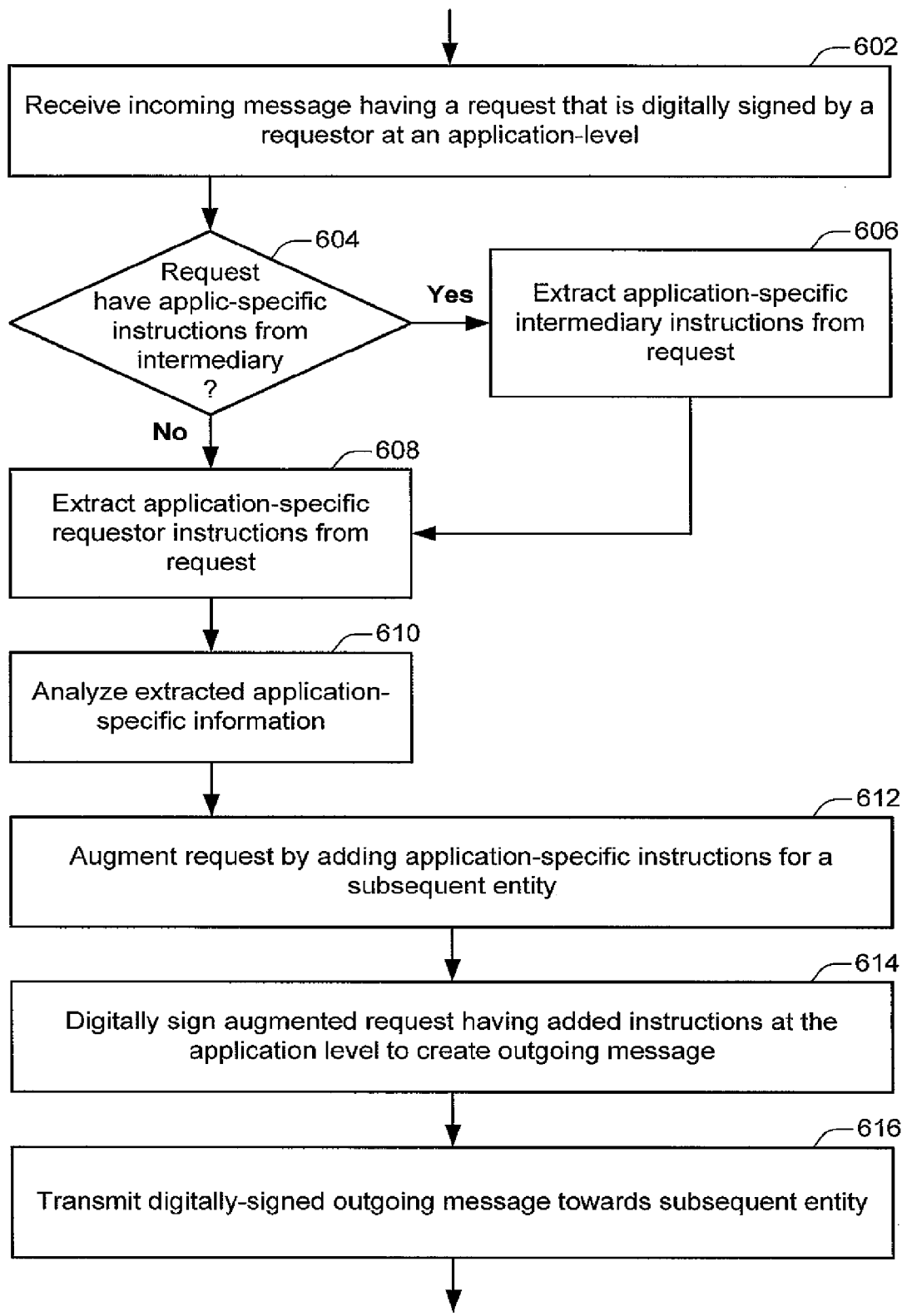
FIG. 6 is a flow diagram that illustrates an example of a method for securely communicating request information on an application-level.

FIG. 6 is a flow diagram 600 that illustrates an example of a method for securely communicating request information on an application-level. Flow diagram 600 includes eight (8) blocks 602-616. Although the actions of flow diagram 600 may be performed in other environments and with a variety of hardware and software combinations, certain aspects of FIGS. 2-5 are used to illustrate an example of the method of flow diagram 600. For example, the actions of flow diagram 600 may be performed by a processing intermediary 204.

At block 602, an incoming message having a request that is digitally signed by a requestor at an application-level is received. For example, intermediary #2 204(2) may receive a message having an application-level request B 208(B) that is at least partially signed by requestor 202. Application-level request B 208(B) encapsulates application-level request A 208(A), which includes a requestor signature 304.

At block 604, it is determined if the received request has any application-specific instructions from a previous intermediary. For example, it may be determined if application-level request B 208(B) includes any application-specific instructions from a previous intermediary 306. As illustrated in FIG. 3B, application-level request B 208(B) does include application-specific instructions from intermediary #1 306(1).

If the received message does have application-specific instructions from a previous intermediary, then at block 606 the application-specific intermediary instructions are extracted from the request. For example, application-specific instructions from intermediary #1 306(1) may be extracted.

After block 606 or after a "No" decision at block 604, application-specific requestor instructions are extracted from the request at block 608. For example, application-specific instructions from requester 302 may be extracted. Thus, after blocks 606 and 608, any application-specific instructions, whether they originate from the requestor or a previous intermediary, have been extracted. Other application-specific information, such as digital signatures 304/308 and/or delegation of rights 402/404, may also be extracted.

At block 610, the extracted application-specific information is analyzed. For example, application-specific requestor instructions 302 and/or application-specific intermediary instructions 306 may be analyzed to determine if the request is to be forwarded to another intermediary or to a request handler or to one or more of both. In other words, the analysis can determine the identity of at least one entity that is to be a subsequent recipient of the request. The analysis can also determine what application-specific instructions should be added to the request by the current intermediary.

When digital signature protections are being utilized, requester signature 304 and/or intermediary signature(s) 308 may be extracted and used to authenticate and/or analyze the integrity of the application-level requests 208. When data delegation information is included in the application-level requests 208, delegation of rights from the requestor 402 and/or delegation of rights from intermediaries 404 may be extracted and used in the analysis, especially to further delegate data access rights to downstream participants.

At block 612, the request is augmented by adding application-level instructions for a subsequent entity. For example, responsive to the analysis of block 610, intermediary #2 204(2) may add application-specific instructions for a subsequent intermediary 306, such as application-specific instructions from intermediary #2 306(2). If delegation rights are being forwarded, intermediary #2 204(2) may further augment the request by adding delegation of rights from intermediary #2 404 to continue a data access rights transitive delegation chain.

At block 614, the augmented request having the added instructions at the application level is digitally signed to create an outgoing message. For example, intermediary #2 204(2) may digitally sign the added application-specific instructions 306(2) and/or the nested application-level requests 208(A and B) to create intermediary #2 signature 308(2).

At block 616, the digitally-signed outgoing message is transmitted towards a subsequent entity. For example, intermediary #2 204(2) may transmit application-level request C 208(C) towards intermediary #3 204(3). Intermediary #3 204 (3) may also apply aspects of the described application-level security protocol for subsequent communications to request handlers 206(1) and 206(2), depending on the logical and trust relationships between them.

Figure 7:
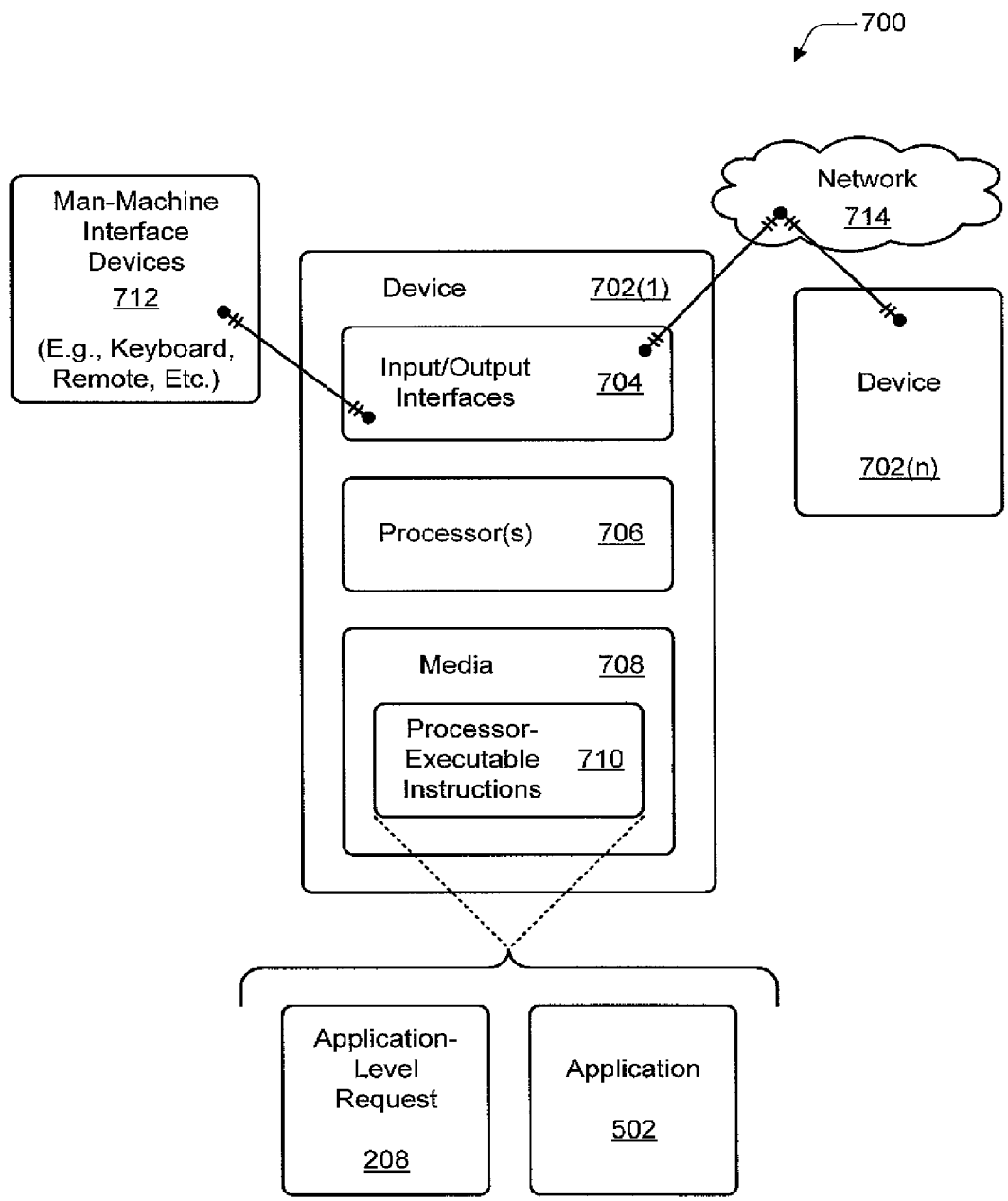
FIG. 7 is a block diagram of an example device that may be used to implement the securing of distributed application information delivery.

FIG. 7 is a block diagram of an example device 702 that may be used to implement the securing of distributed application information delivery. Multiple devices 702 are capable of communicating across one or more networks 714. Network 714 may be an internet, an intranet, an Ethernet, a wireless network, a wired network, a public network, a private network, a cable network, a digital subscriber line (DSL) network, a telephone network, a Fibre network, a Grid computer network, a network of resource clusters, some combination thereof, and so forth.

As illustrated, two devices 702(1) and 702(n) are capable of engaging in message communication transmissions, such as the forwarding of application-level requests 208, via network 714. Although two devices 702 are specifically shown, one or more than two devices 702 may be employed, depending on implementation. Requestors 202, intermediaries 204, request handlers 206, etc. may be realized as devices 702.

Generally, a device 702 may represent any computer or processing-capable device, such as a server device; a workstation or other general computer device; a data storage repository apparatus; a personal digital assistant (PDA); a mobile phone; a gaming platform; an entertainment device; a router computing node; some combination thereof; and so forth. As illustrated, device 702 includes one or more input/output (I/O) interfaces 704, at least one processor 706, and one or more media 708. Media 708 include processor-executable instructions 710.

In a described implementation of device 702, I/O interfaces 704 may include (i) a network interface for communicating across network 714, (ii) a display device interface for displaying information on a display screen, (iii) one or more man-machine interfaces, and so forth. Examples of (i) network interfaces include a network card, a modem, one or more ports, a network communications stack, and so forth. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 712 (e.g., a keyboard, a remote, a mouse or other graphical pointing device, etc.).

Generally, processor 706 is capable of executing, performing, and/or otherwise effectuating processor-executable instructions, such as processor-executable instructions 710. Media 708 is comprised of one or more processor-accessible media. In other words, media 708 may include processor-executable instructions 710 that are executable by processor 706 to effectuate the performance of functions by device 702.

Thus, realizations for the securing of distributed application information delivery may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media and/or executed by different processors.

Processor(s) 706 may be implemented using any applicable processing-capable technology. Media 708 may be any available media that is included as part of and/or accessible by device 702. It includes volatile and non-volatile media, removable and non-removable media, and storage. For example, media 708 may include an array of disks for longer-term mass storage of processor-executable instructions 710, random access memory (RAM) for shorter-term storing of instructions that are currently being executed and/or otherwise processed, and so forth.

As specifically illustrated, media 708 comprises at least processor-executable instructions 710. Generally, processor-executable instructions 710, when executed by processor 706, enable device 702 to perform the various functions described herein. Such functions include, but are not limited to: (i) realizing the application-level communication participants that are illustrated in FIG. 2; (ii) performing those actions that are illustrated in flow diagram 600 (of FIG. 6); (iii) implementing those data structure(s) 208 that are illustrated in FIGS. 3A, 3B, 3C, and 4; (iv) realizing the application 502 that is illustrated in FIG. 5; and so forth. By way of example only, processor-executable instructions 710 may include one or more application-level requests 208, an application 502, some combination thereof, and so forth.

The devices, actions, aspects, features, functions, procedures, modules, data structures, protocols, computing systems, components, etc. of FIGS. 1-7 are illustrated in diagrams that are divided into multiple blocks. However, the order, interconnections, interrelationships, layout, etc. in which FIGS. 1-7 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for the securing of distributed application information delivery.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. One or more processor-accessible memories including processor-executable instructions, the processor-executable instructions comprising a data structure for a secure application instruction protocol, the data structure including:
    a first application-level request comprising application-specific instructions from a requestor and a requestor signature over the application-specific instructions from the requestor, wherein the application-specific instructions from the requestor do not specify a request handler, and wherein the requestor is an initial requestor and the request handler is an end point request handler and not an intermediary; and
    a second application-level request comprising application-specific instructions from an intermediary, an intermediary signature over at least the application-specific instructions from the intermediary, and delegation of rights information for the end point request handler, the delegation of rights information enabling the end point request handler to access data associated with the first application-level request or to further delegate rights to the data, wherein the application-specific instructions from the intermediary are dynamically-determined by the intermediary based at least in part on an analysis of the application-specific instructions from the requestor to determine where to forward the first application-level request and determine the end point request handler, wherein the first application-level request is nested within the second application-level request.

2. The one or more processor-accessible memories as recited in claim 1, wherein the first application-level request further comprises a delegation of rights from the requestor to access data.

3. The one or more processor-accessible memories as recited in claim 1, wherein the intermediary signature is also over the first application-level request.

4. The one or more processor-accessible memories as recited in claim 1, wherein:
    the first application-level request further comprises a delegation of rights for data access from the requestor, and
    the second application-level request further comprises a delegation of rights for data access from the intermediary; and
    the data structure further includes:
        a third application-level request comprising application-specific instructions from another intermediary, another intermediary signature over at least the application-specific instructions from the intermediary, and a delegation of rights for data access from the intermediary; and wherein the first application-level request and the second application-level request are nested within the third application-level request.

5. The one or more processor-accessible memories as recited in claim 4, wherein each of the delegation of rights for data access comprises delegation information; and wherein the delegation information is encrypted.

6. The one or more processor-accessible memories as recited in claim 1, wherein the application-specific instructions from the intermediary track identities of participating entities.

7. The one or more processor-accessible memories as recited in claim 1, wherein the intermediary separates a requested task of the application-specific instructions from the requestor into a plurality of parts and forwards at least a first part to a first request handler and a second part to a second request handler other than the first request handler.

8. A device including an application that implements a secure application instruction protocol, the device comprising:
    one or more processors; and
    memory storing computer-executable instructions executable by the one or more processors, the memory storing:
        an application-specific information extractor to receive an incoming application-level request comprising application-specific instructions from a requestor and to extract the application-specific instructions from the requestor, wherein the application-specific instructions from the requestor do not specify an end point request handler, and wherein the requestor is an initial requestor;
        an application-specific information analyzer to analyze the extracted application-specific instructions from the requestor to: dynamically determine an identity of a subsequent recipient of the incoming application-level request, and determine additional application-specific instructions for the subsequent recipient;
        a message augmenter to add the additional application-specific instructions for the subsequent recipient and delegation of rights information so that the subsequent recipient can access data or further delegate rights to access the data; and
        a message signer to digitally sign at least the additional application-specific instructions for the subsequent recipient, the incoming application-level request and the added delegation of rights information to create an outgoing application-level request, and to add an outgoing intermediary signature to the outgoing application-level request, wherein the device is to forward the outgoing application-level request toward the subsequent recipient.

9. The device as recited in claim 8, wherein the incoming application-level request comprises a requestor signature over the application-specific instructions from the requestor.

10. The device as recited in claim 9, wherein the incoming application-level request further comprises application-specific instructions from an intermediary and an intermediary signature over the application-specific instructions from the intermediary.

11. The device as recited in claim 10, wherein:
the application-specific information extractor is further configured to extract the application-specific instructions from the intermediary from the incoming application-level request; and
the application-specific information analyzer is further configured to analyze the application-specific instructions from the intermediary to: dynamically determine the identity of the subsequent recipient, and determine the additional application-specific instructions for the subsequent recipient.

12. The device as recited in claim 10, further comprising:
a message participant authenticator to authenticate that the application-specific instructions from the requestor truly originated from the requestor using the requestor signature and that the application-specific instructions from the intermediary truly originated from the intermediary using the intermediary signature.

13. The device as recited in claim 10, further comprising:
a message information integrity validator to validate that the application-specific instructions from the requestor are unmodified since being signed by the requestor using the requestor signature and that the application-specific instructions from the intermediary are unmodified since being signed by the intermediary using the intermediary signature.

14. A computer-implemented method comprising:
receiving an incoming message having a request that is digitally-signed by a requestor at an application-level, the request comprising application-specific requestor instructions from the requestor, wherein the application-specific requestor instructions from the requestor do not specify a request handler, and wherein the requestor is an initial requestor and the request handler is an end point request handler and not an intermediary;
analyzing the application-specific requestor instructions;
based at least in part on the analyzing:
  dynamically determining an identity of a subsequent computing entity, and
  augmenting the request by adding application-specific instructions for the subsequent computing entity and delegation of rights information for the subsequent computing entity, the delegation of rights information enabling the subsequent computing entity to access data associated with the request or to further delegate rights to the data;
digitally-signing the application-specific instructions for the subsequent computing entity to create an outgoing message that includes the request, the application-specific instructions for the subsequent computing entity, and a digital signature over the application-specific instructions for the subsequent computing entity; and
transmitting the outgoing message towards the subsequent computing entity.

15. The method as recited in claim 14, further comprising:
extracting application-specific intermediary instructions, which were originated by a previous intermediary, from the request;
extracting the application-specific requestor instructions, which were originated by the requestor, from the request; and
analyzing the application-specific intermediary instructions and the application-specific requestor instructions to determine the identity of the subsequent computing entity.

16. The method as recited in claim 14, further comprising:
extracting the application-specific requestor instructions, which were originated by the requestor, and a requestor signature from the request;
authenticating that the application-specific requestor instructions were originated by the requestor using the requestor signature; and
validating integrity of the application-specific requestor instructions using the requestor signature.

* * * * *